July 20, 1954     R. K. SOUTH     2,683,903
KNOCKDOWN DOGHOUSE
Filed Nov. 20, 1951

INVENTOR.
Robert K. South
BY
Murray, Sackloff & Murray
ATT'YS

Patented July 20, 1954

2,683,903

UNITED STATES PATENT OFFICE 2,683,903

KNOCKDOWN DOGHOUSE

Robert K. South, Cincinnati, Ohio, assignor of one-half to Orren J. South, Cincinnati, Ohio Application November 20, 1951, Serial No. 257,260

5 Claims. (Cl. 20—2)

The present invention relates to dog houses and has for an object the provision of a structure that is economically manufactured of suitable plywood and is adapted for storage and shipment in knocked down and compactly packaged form.

Another object of the invention is to provide a structure of the class described that is easily and quickly assembled or dismantled without the aid of tools or of inserted fasteners.

A further object of the invention is to provide a dog house having a self closing door that may be opened by the animal from within or without the house, said door being arranged to be bolted from the inside to prevent entry or exit of the animal.

A still further object of the invention is to provide a structure of the class described that is sturdy and light in weight and is adaptable for ready conversion at will into a dog bed for use in sheltered locations or a shipping crate in which the animal can be securely locked against escape or unauthorized removal while in the hands of the agents of common carriers.

These and other important advantages are attained by the means described herein and exemplified in the accompanying drawings, in which.

Figure 1:
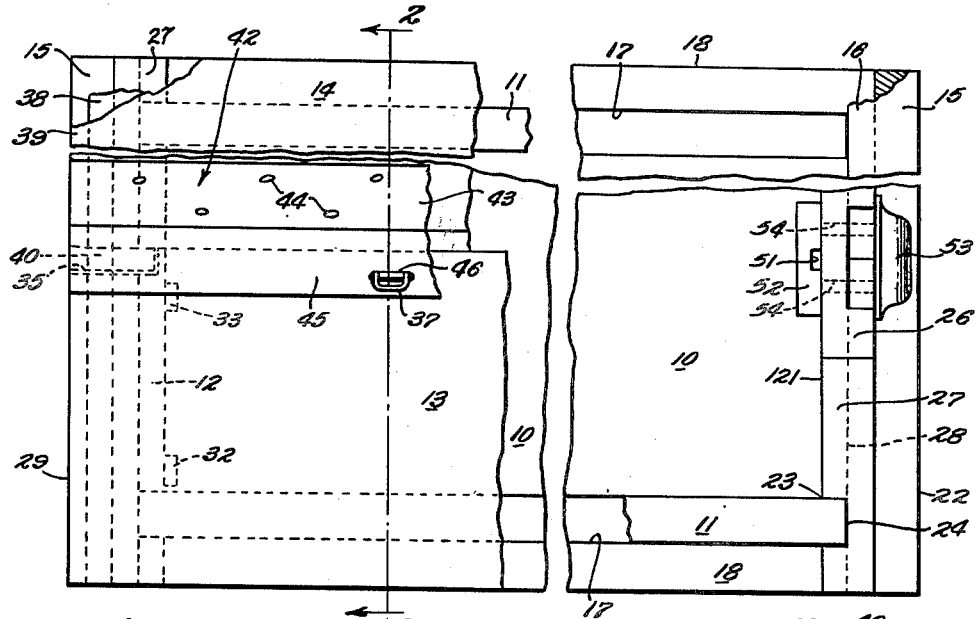
Fig. 1 is a top plan view of a device of the invention, parts being broken away to show the construction.

The housing, care and shipment of dogs often includes the use of several structures. The dog house of the invention is desirably constructed of simply and inexpensively fabricated parts made of weatherproof plywood so as to utilize a minimum of bulk and weight while affording protection for the animal against the elements.

The several parts are provided with interengaging joints that are progressively assembled or separated in erecting or dismantling the selective structures attainable according to the device of my invention.

In the preferred form illustrated, the assembled device takes essentially the well known gable roofed form. The device hereinafter described will be understood to be subject to minor modifications within the spirit of the invention and the scope of the appended claims.

As shown in the drawings, the knockdown dog house of the invention comprises a base or floor 10, a pair of similar longitudinal side walls 11, a pair of end walls 12 and 121, and a pair of roof members 13 and 14, all of said parts being desirably made of suitable plywood for light weight and simplicity of fabrication.

The floor 10 has secured to its top face, across the ends of the floor, battens 15 provided with flanges 16 projecting therefrom in spaced parallel relation to the top face of the floor. A pair of grooves or gains 17 are cut into the floor 10 to a depth substantially one-half the thickness of the latter, and said gains are disposed in spaced parallelism with the longitudinal edges 18 of the floor and terminate substantially at the tongues 16.

End walls 12 and 121 are substantially similar except that front end wall 12 has a doorway while rear end wall 121 does not. A description of front end wall 12 will suffice for both end walls.

End wall 12 has its bottom edge 19 resting on top of floor 10 and has its vertical side edges 20 disposed in the planes of longitudinal edges 18 of the floor. A horizontal groove or gain 21 is cut into the exterior face of wall 12 for receiving therein the tongue or flange 16 on the batten 15 at an end 22 of the floor. A pair of vertical gains or grooves 23 are cut into the interior face of wall 12 to receive the vertical end edges 24 of side walls 11 while the bottom edges 25 of said side walls seat in floor gains 17.

The assembly of the two end walls 12 and 121 on the floor and the insertion of the side walls between the end walls will be readily understood to interengage the parts to prevent relative movement of the floor and end walls in any direction so long as the side walls are properly positioned in the manner described and shown.

The end wall 12 has a top central horizontal edge portion 26 and a pair of oppositely inclined top edge portions 27 connecting opposite ends of portion 26 with the vertical edges 20. Gains 28 are cut in the exterior face of wall 12 in parallelism with the inclined end edges 27, and terminate in the edges 20 and 26.

The roof section 13 has secured to its underside, in closely spaced parallelism to each end edge 21, a batten 30 having a tongue 31 for slidable entry into a gain 28 in an end wall 12 or 121 whereby the roof section is retained in position on the end walls and the side wall 11 is held against removal.

A stop block 32 is secured on the underside of roof section 13 to slide along the inside face of wall 12 into abutment with side wall 11. A second block 33 is located near the top edge of the roof and serves purely as a guide. The top edge 34 of roof section 13 has a rectangular corner section cut away at each end to provide a re-entrant notch 35 and the end of batten 30 is cut away angularly at 36 where it projects below the notch 35. A staple 37 is secured to the top face of roof section 13.

Figure 3:
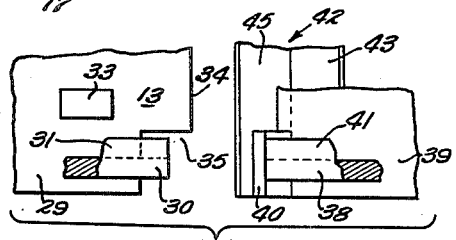
Fig. 3 is a fragmental bottom plan view of the roof sections of the device in separated relation.
Figure 2:
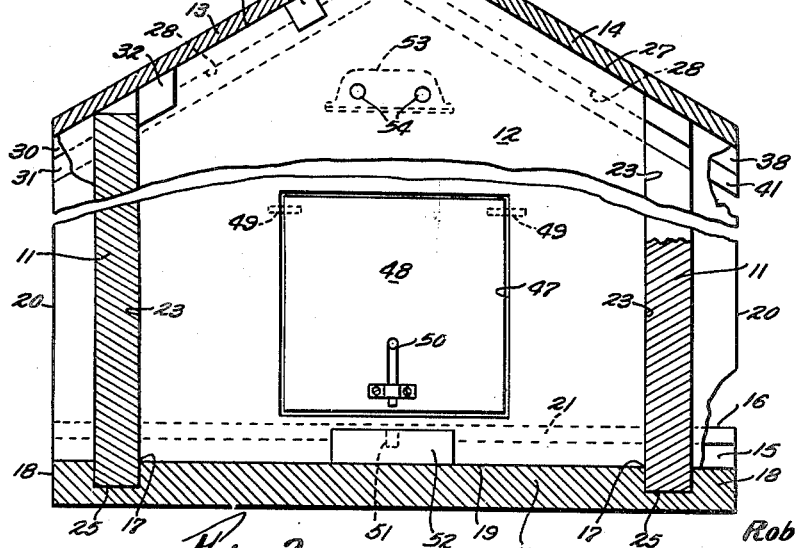
Fig. 2 is a cross sectional view taken on line 2—2 of Fig. 1.

The roof sections 13 and 14 are suitably beveled at the top longitudinal edges as shown in Fig. 2 to provide a conventional gable ridge. A batten 38, is secured in parallelism to each end edge 39 of roof section 14 and a piece 40 (which was cut from the corresponding end of roof section 13 in forming the notch 35) is secured on the beveled end of said batten 38 (see Figs. 1 and 3). Said batten has a flange or tongue 41 for slidable entry into a groove or gain 38 in the end wall.

A sheet metal cap strip 42 is angularly bent to provide a flange 43, which is secured, as by rivets or screws 44 to the top face of roof section 14, and a flange 45 which is adapted to seat on top of roof section 13 and to cover the joint where the piece 40 seats in the notch 35. The flange 45 has a slot 46 that passes the staple 37 so that a padlock (not shown) can be applied to prevent dismantling of the assembled structure.

The front end wall differs from rear end wall in that it has the doorway 47. A door 48 is mounted on suitable pins 49 near the tops of its side edges so that it may swing inwardly and outwardly through the doorway when the dog pushes against the door. For the purpose of adapting the dog house as a locked shipping crate for the dog, a suitable bolt 50 or the like, is mounted for vertical shifting on the door for movement into and from a socket 51 in a block 52 secured on floor 10, which block cooperates with the strip 15 in guiding and holding the end wall in its position on the floor. Each of the end walls is provided with a sash-lift type handle 53 which also serves as a protective hood for one or more ventilating holes 54 in the end wall.

The device of the invention may be conveniently stacked and/or packaged in knockdown form with a saving in storage and shipping space and can be easily assembled and dismantled without the use of tools. The preferred plywood construction affords light weight and conveniently handled parts in addition to the simplification in cutting the gains or grooves in manufacture.

In assembling the parts the two end walls 12 and 121 are slidably moved along the battens 15 so that the tongues 16 of the battens enter the gains 21 of the end walls. The blocks 51 serve as guides for the inner faces of the said end walls which walls are thus held against movement other than a sliding entry or removal movement. When the end walls are erected with the gains 23 therein disposed in the planes of the floor grooves or gains 17 the side walls 11 may be seated at the end edges and bottoms in said gains 23 and 21.

Roof member 13 is now assembled onto the structure by entering the tongues 31 into the top open ends of the inclined gains 28 at one side of each end wall the lower ends of the tongues being entered from the cut out in edge portion 26 of each end wall. The stop block 32 initially cooperates as a guide sliding on the inside face of the end wall and the block 33 similarly assists in guiding the roof section downwardly into the position shown in Fig. 2 where block 32 also abuts the inside face of side wall 11. When the structure is thus far assembled it can be used as a dog's bed or sleeping box. When a fully roofed dog house is desired the roof section 14 is entered into position from the top center of the end walls 12 and 121, the lower or outer ends of battens 38 passing through cut out notches 35 in roof section 13 and along the inclined end 36 of batten 30 (see Fig. 2). The tongues 41 on the battens 38 slide longitudinally downwardly in gains 28 until the blocks 40 enter and fill notches 35 and the flange 45 of the sheet metal cap strip 42 seats flatwise on roof section 13. The staple 37 on roof section 13 passes through the slot 46 as the roof sections approach their assembled position.

The roof section 14 may be partially or fully removed by reverse movement thereof. The slide bolt 50 on door 48 may be normally raised (or removed) to permit entry and egress of the animal at will. It will be understood that the dog house may have the door 48 omitted if it is not wanted.

If it is desired to temporarily pen the dog in the house the roof section 14 may be slidably raised sufficiently to permit the hand to move bolt 50 into socket 51 without allowing the dog to escape and then lower section 14 to closed position. The house is now bolted from the inside and the dog is housed therein unable to escape, but he may be released by a person who slides the roof section 14 upwardly. If however, it is desired to prevent unauthorized release or removal of the dog, any suitable padlock (not shown) can be applied to staple 37. In this condition the device is ideal for a shipping crate or pen to prevent surreptitious removal of the dog during transport by rail or truck since the authorized agent of the carrier would have the key for the padlock to afford access for feeding and watering the animal en route. The handles 53 facilitate lifting and carrying of the dog house or shipping pen and at the same time exclude entry of rain or snow through ventilating holes 54.

The symmetrical disposition of the gains and the tongues on the battens provide for interchange of the relative positions of the end walls, side walls and roof sections and thereby further simplifies the assembly of the structure and the adaptation to its several specific and general uses.

What is claimed is:

1. In a device of the class described the combination of a floor having tongues projecting edgewise toward each other from opposite ends and in spaced parallelism with the top face of the floor, said top face of the floor having spaced parallel gains therein terminating at their opposite ends beneath the edges of said tongues, a pair of end walls seating edgewise upright on top of the floor and having in their exterior faces transverse gains in spaced parallelism with their top and bottom edges and further having in their interior faces upright gains on spaced parallelism with their vertical side edges, the gains adjacent the bottom edges of said end walls receiving the tongues on said floor, a pair of side walls removably inserted between said end walls with the vertical end edges of said side walls slidably received in the upright gains in said endwalls and the bottom edges of said side walls seating in the gains in said floor, a first roof section having tongues projecting edgewise toward each other from opposite ends and in spaced parallelism with the bottom face of the roof section and slidably entered in the transverse gains adjacent the top edges of the endwalls to position the roof section on and over the tops of said endwalls and one of said side walls, an abutment on the bottom face of the roof section and engaging the interior face of the said side wall to positively retain said floor, endwalls and side wall against separation, a second roof section having inturned tongues slidably engageable in the transverse gains adjacent the tops of the end walls to prevent removal of the other of said side walls, a cap strip secured on the second roof section and including a flange adapted to rest on the first roof section, said flange having a slot therein, and a staple in the first roof section adapted to pass through the said slot in the said flange for receiving a padlock whereby the assembled device is locked in closed assembled condition.

2. A device according to claim 1 characterized by the fact that the end walls are provided near the top with ventilating holes and handles are secured on said end walls for lifting the device and for providing a hood over the apertures to exclude the elements from entry through said holes.

3. A device according to claim 1 characterized by the fact that the said first roof section has a guide and stop block member on the underside for moving along the inside face of the end wall and abutment against the adjacent side wall whereby the device is retained as a self-sustained unit in the absence of said second roof section.

4. In a device of the class described the combination of a floor having a gain in the top face in spaced parallelism with each of its longitudinal side edges, battens extending across opposite ends of the floor and providing tongues parallel with the floor and with each other, and projecting toward each other, a pair of end walls having exteriorly disposed gains adjacent the bottom edges adapted and arranged respectively to slidably receive the several tongues on said battens as said end walls are moved with their bottom edge across the floor and along the battens, each end wall having on its interior face a pair of vertical gains adapted to register with the gains in the floor, a pair of rectangular side walls each adapted at opposite ends for slidable entry in the gains on a common side of said pair of end walls and to have its bottom longitudinal edge seated in the adjacent gain in the floor, said end walls having gains in parallelism in the exterior faces thereof adjacent the top edges thereof, a roof section, shouldered battens secured on the underside thereof along each end of said roof section for slidable entry of the tongues into the gains adjacent the tops of the end walls and a block secured on said roof section in spaced relation to the batten and serving as a guide for slidable movement along the interior face of an end wall and as a stop for abutment with an interior face of a side wall adjacent the top of the latter.

5. In a device of the class described the combination of a floor, a pair of end walls mounted on the floor, a pair of side walls extending between the end walls from the floor to the top edges of the end walls, the end walls having the top edges inclined uniformly for supporting an inclined roof, a first roof section including battens secured across the ends on the underside thereof and undercut to provide tongues, the exterior faces of the end walls having gains therein parallel with the top edges thereof and spaced therefrom for slidable entry of the tongues therein, the ends of the battens adjacent the upper edge of the roof section being angularly undercut and the upper corners of said roof section being cut away to form rectangular notches, a second roof section including tongue carrying battens on the underside thereof at opposite ends adapted for slidable movement across the said undercut ends of the battens on the first mentioned roof section and through the notches in the latter, said end walls having in the exterior faces a second set of gains inclined oppositely to the first mentioned gains for receiving the tongues on the battens on said second roof section, the last mentioned battens each having a relatively upper end inclined to form a roof gable angle with the companion batten on the first roof section, a rectangular block secured on each of the last mentioned inclined ends of said battens and adapted to fill the notches in the corners of the first roof section, and a cap strip member secured along the top of the second roof section and including an angularly related flange overhanging the edge thereof for covering the joints between adjacent edges of the roof and between said notches and the said blocks.

References Cited in the file of this patent

UNITED STATES PATENTS

| Number | Name | Date |
|---|---|---|
| 55,061 | Clement | May 29, 1866 |
| 255,458 | Rockwell | Mar. 28, 1882 |
| 419,920 | Campbell | Jan. 21, 1890 |
| 2,498,411 | Geib | Feb. 21, 1950 |